(12) United States Patent
Johnson

(10) Patent No.: US 6,629,416 B1
(45) Date of Patent: Oct. 7, 2003

(54) AFTERBURNING AEROSPIKE ROCKET NOZZLE

(75) Inventor: Randolph T. Johnson, Waldorf, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 29 days.

(21) Appl. No.: 10/131,915

(22) Filed: Apr. 25, 2002

(51) Int. Cl.⁷ .................................................. F02K 1/04
(52) U.S. Cl. ........................ 60/770; 60/761; 239/265.17
(58) Field of Search ........................ 60/770, 246, 39.63, 60/761; 239/265.17

(56) References Cited

U.S. PATENT DOCUMENTS

| | | | |
|---|---|---|---|
| 2,928,235 A | * 3/1960 | Johnson | 239/265.25 |
| 3,112,612 A | * 12/1963 | Adamson | 60/228 |
| 3,151,446 A | * 10/1964 | Parilla | 60/219 |
| 3,358,453 A | * 12/1967 | Sweet | 60/225 |
| 4,315,401 A | 2/1982 | Beal et al. | 60/261 |
| 4,896,501 A | 1/1990 | Faulkner | 60/261 |
| 5,201,832 A | 4/1993 | Porter et al. | 244/158 |
| 5,341,640 A | 8/1994 | Faulkner | 60/251 |
| 6,036,144 A | 3/2000 | Sisk | 244/172 |
| 6,098,401 A | 8/2000 | Alassoeur et al. | 60/261 |
| 6,213,431 B1 | 4/2001 | Janeke | 244/172 |
| 6,293,091 B1 | * 9/2001 | Seymour et al. | 60/225 |
| 6,516,605 B1 | * 2/2003 | Meholic | 60/247 |

* cited by examiner

Primary Examiner—Ehud Gartenberg
(74) Attorney, Agent, or Firm—Mark Homer

(57) ABSTRACT

An aerospike nozzle includes a nozzle body and a spike, the nozzle body and the spike defining a generally annular gas flow channel therebetween; the spike comprising an upper, generally conical section having a decreasing diameter in a downstream direction; a middle, generally cylindrical section having a generally constant diameter; and a lower, generally conical section having a decreasing diameter in a downstream direction; a shroud disposed radially outward of the spike and longitudinally downstream of the nozzle body, the shroud comprising a first generally cylindrical section and, downstream of the first section, a second generally concave section; a plurality of struts connected between the spike and the shroud; an ambient air inlet defined between the nozzle body and the shroud; a mixing and combustion chamber defined between the spike and the first section of the shroud; and an expansion chamber defined between the spike and the second section of the shroud.

6 Claims, 2 Drawing Sheets

DOWNSTREAM

AFTERBURNING AEROSPIKE ROCKET NOZZLE

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to aerospike rocket nozzles and in particular to afterburning aerospike rocket nozzles.

Rocket motors are limited in their performance by the energy content of their propellants and the need to carry their oxidizer with them. Rocket motors do, however, provide near-instantaneous thrust and are not limited to atmospheric operation. Jet engines use air to provide their oxidizer, but are either inherently complex (e.g., turbojets and turbofans) or provide no thrust at zero initial speed (ramjets). Because of their use of atmospheric oxygen, jet engines cannot operate in space and take a considerable period of time to "spool-up" to full thrust. Jet engines also tend to need substantial levels of maintenance and are quite costly to acquire, maintain and operate. Rocket motors (particularly solid fuel rocket motors) tend to be relatively inexpensive to acquire, require minimal maintenance and virtually nothing to operate.

To try to improve the delivered energy of rocket motors, many methods have been employed. The energy of the fuels and oxidizers have been increased, the nozzles have been contoured and modified to improve their efficiency and the operating pressures have been increased. However, the delivered propellant specific impulse (a measure of the thrust produced per unit mass of propellant) has not appreciably changed since the 1950's. Another approach has been to use so-called "ducted rockets," which bring air into the combustion chamber via inlets and flow ducts, where the air combines with the propellant gases to increase the specific impulse of the propellant. While ducted rockets have been investigated since at least the mid 1960's, they have never progressed beyond the prototyping stage because of their inherent difficulties and complexity. In particular, bringing air into the combustion chamber uses much available volume which could otherwise be used for propellant and subjects the duct materials to extremely harsh thermal and flow conditions. To date, no one has been able to overcome these problems with sufficient success to justify the increased cost and complexity.

The present invention, an afterburning aerospike nozzle, improves the delivered energy density of rocket motors, with less complexity than ducted rocket motors.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Figure 1:
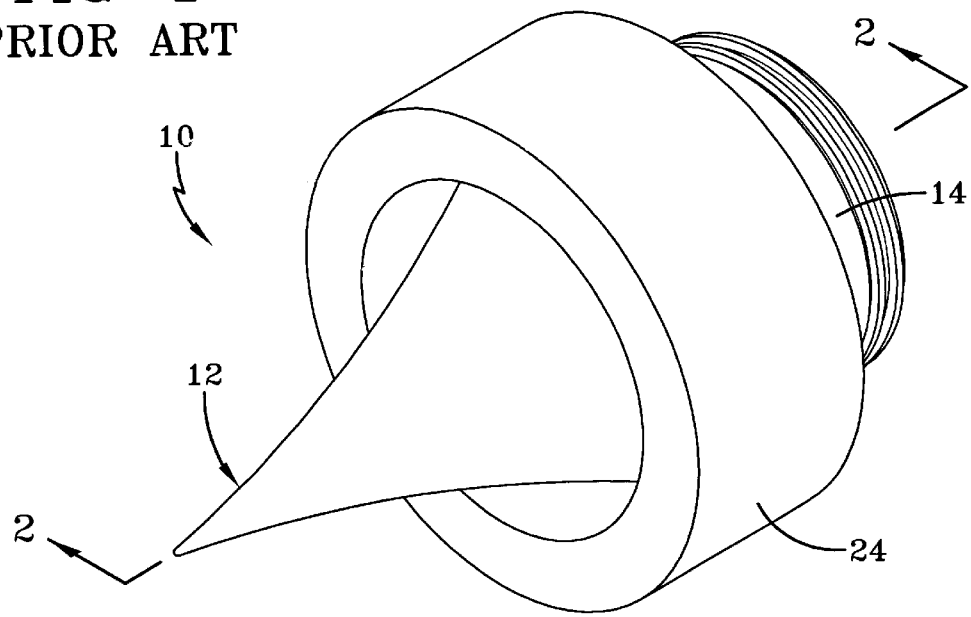
FIG. 1 is a perspective view of a known aerospike nozzle.
Figure 2:
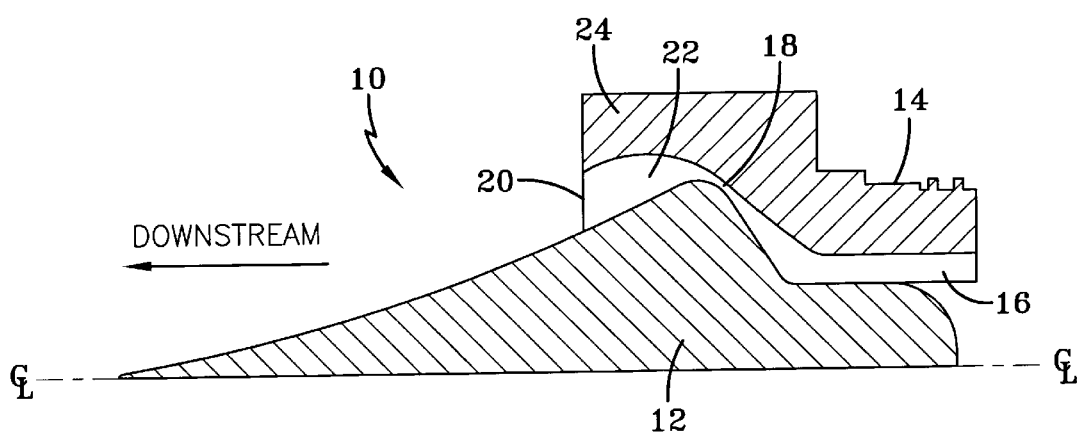
FIG. 2 is a cross section along the line 2—2 of FIG. 1.

FIG. 1 is a perspective view of a known aerospike nozzle 10. FIG. 2 is a cross section along the line 2—2 of FIG. 1. In FIG. 2, the lower half of the cross-section below the centerline is not shown, but is a mirror image of the upper half.

Aerospike nozzle 10 includes nozzle body 24 and spike 12 which define therebetween a combustion gas flow channel 16. The combustion gas flows in to the flow channel 16 from the rocket motor (not shown) on the right side of the drawing in FIG. 2. The gas flows in the direction indicated by the DOWNSTREAM arrow in FIG. 2. Nozzle body 24 includes portion 14 for attachment to the rocket motor case.

The combustion gases are forced through a narrow annulus that forms the throat 18 of the flow channel 16. The gas first expands in expansion area 22 where it exerts pressure on both the nozzle body 24 and spike 12. The flow channel 16 ends at exit 20. The gas then exerts pressure against the spike 12 until it leaves the nozzle 10 completely. The thrust of the nozzle is produced by the pressure acting on the internal expansion area 22 of the nozzle body 24 along with the pressure acting on the spike 12.

While the expanding gases are higher in pressure than the local atmospheric pressure as they leave the expansion area 22, the exhaust can never be overexpanded. Overexpanded means that the pressure in the gas leaving the exit 20 is lower than that in the atmosphere it enters. This situation would result in a net loss of thrust from the nozzle. The spike 12 functions to recover a portion of the energy that would otherwise be lost from exhausting underexpanded gases above the design altitude of the inner nozzle. Often, the gas leaving exit 20 is fuel rich, that is, it contains unburned fuel. The present invention described below helps to utilize any unburned fuel.

Figure 3:
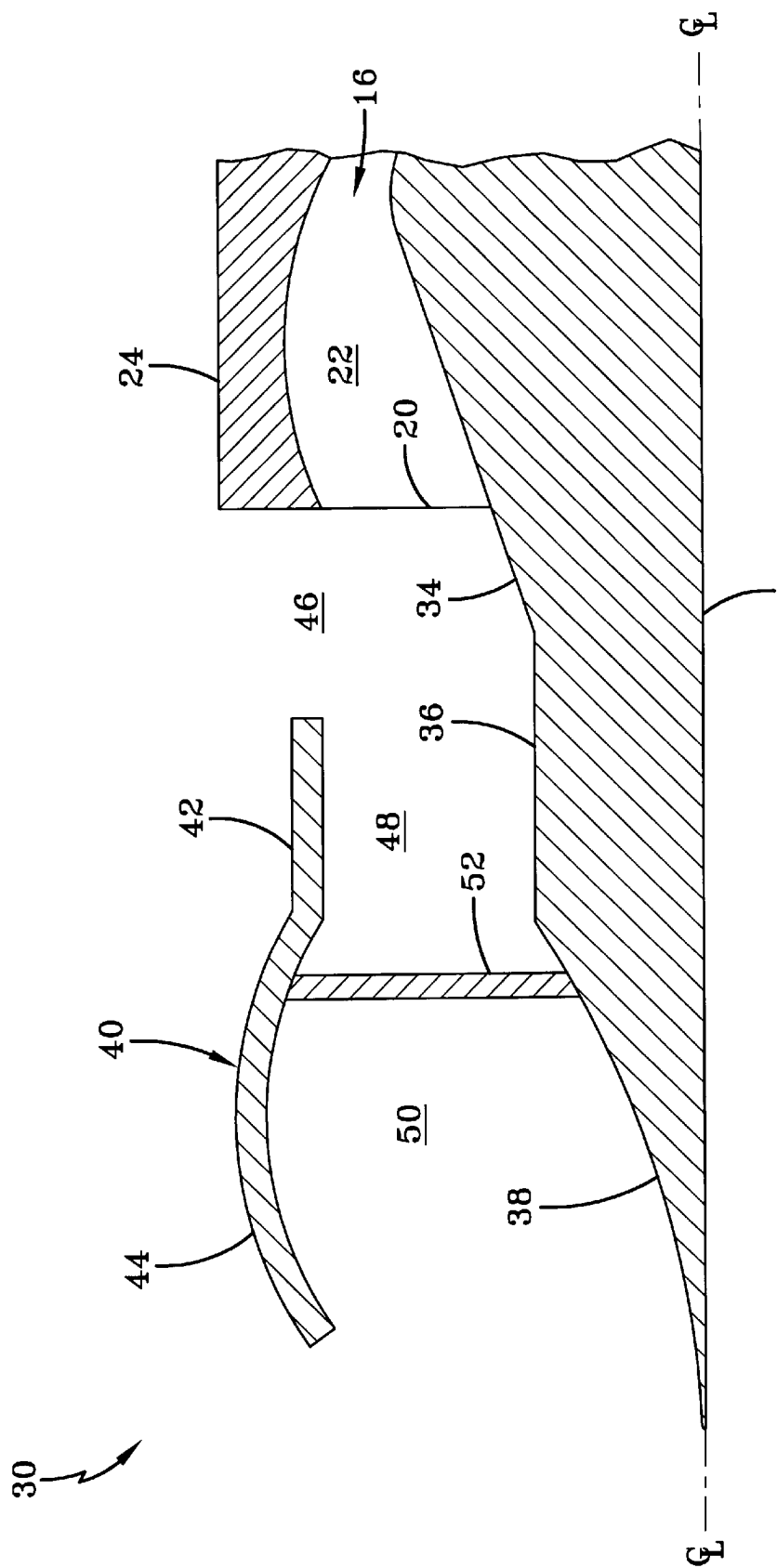
FIG. 3 is a partial cross section of an aerospike nozzle according to the invention.

FIG. 3 is a partial cross section of an aerospike nozzle 30 according to the invention. That portion of nozzle 30 to the right of (upstream of) exit 20 is the same as shown in FIG. 2 and is not shown in FIG. 3.

As shown in FIG. 3, the aerospike nozzle 30 includes a nozzle body 24 and a spike 32. The nozzle body 24 and spike 32 define a generally annular gas flow channel 16 therebetween. The spike 32 includes an upper, generally conical section 34 having a decreasing diameter in a downstream direction; a middle, generally cylindrical section 36 having a generally constant diameter; and a lower, generally conical section 38 having a decreasing diameter in a downstream direction.

Nozzle 30 further includes a shroud 40 disposed radially outward of the spike 32 and longitudinally downstream of the nozzle body 24. The shroud 40 includes a first generally cylindrical section 42 and, downstream of the first section 42, a second generally concave section 44. Strut 52 connects shroud 40 to spike 32. While one strut 52 is shown in FIG. 3, it should be understood that a plurality of struts 52 are disposed radially around spike 32 to connect shroud 40 to the spike. The number, configuration and exact location of the struts 52 may vary, depending on thermal, ballistic and structural requirements.

An ambient air inlet 46 is defined between the nozzle body 24 and the shroud 40. A mixing and combustion chamber 48 is defined between the spike 32 and the first section 42 of the shroud 40. An expansion chamber 50 is defined between the spike 32 and the second section 44 of the shroud 40.

In a preferred embodiment, the first section 42 of the shroud 40 is disposed radially outward from the middle section 36 of the spike 32 and the second section 44 of the shroud 40 is disposed radially outward from the lower section 38 of the spike 32.

In one embodiment, each strut 52 is connected at one end to the lower section 38 of the spike 32 and at another end to the second section 44 of the shroud 40. In another embodiment, each strut 52 is connected at one end to the middle section 36 of the spike 32 and at another end to the first section 42 of the shroud 40. The lower section 38 of the spike 32 may define a generally concave outer surface.

The aerospike nozzle 30 operates as follows. The fuel rich (oxidizer poor) propellant gases exhaust from exit 20. The flow of the propellant gases entrains ambient air through the ambient air inlet 46 (via viscous forces), much as the aspirator commonly used in laboratories draws air from a desiccator. The ambient air and propellant gases are then forced to combine in the mixing and combustion chamber 48. The combined ambient air and propellant gases then expand out over the lower section 38 of the spike and the second section 44 of the shroud to produce the final thrust. The lower section 38 of the spike serves both as a means to extract the energy from the high pressure gases and as a flame holder.

The relative dimensions of the components may be modified to optimize the fuel-air ratio. For instance, if more air is required, the ambient air inlet 46 can be made larger than the exit 20 to catch "ram air" from the area next to the rocket motor while it is in high speed flight. The components of the invention can all be fabricated from conventional nozzle materials without extending the state of the art beyond that required by the nozzle itself.

The volume used by the mixing and combustion or afterburning chamber 48 on aerospike nozzle 30 is the same region that would be used by the expansion cone on a conventional nozzle. Therefore, the additional impulse is obtained without increasing the size of the rocket motor. Calculations suggest that increases of 50% to 100% in propellant specific impulse are achievable using the present invention. While there is some increase in drag created by adding the ambient air inlet 46, it may be no greater than that created by the inherent recirculation region around a conventional exit cone. The increase in specific impulse results in greater range and greater velocity.

Use of aerospike nozzle 30 introduces the opportunity for varying the thrust of the rocket motor by moving the spike 32 into or out of the nozzle body 24. This simple expedient varies the flow area at the throat of the nozzle. Changing the throat area changes the internal pressure of the rocket motor which changes the burning rate of the propellant. This means that one can achieve high thrusts or lower thrusts as needed for a mission profile. That capability will allow a solid propellant rocket motor to be used in place of more expensive liquid rocket motors where variable thrust is a requirement.

The aerospike nozzle 30 can also produce a vectored (directed) thrust by moving the spike 32 and/or the nozzle body 24 to one side or canted relative to the center line of the rocket motor. Therefore, the direction of flight can be controlled without fins or other complex (e.g., gimbaled nozzle) or energy absorbing (e.g., jet tabs) mechanisms. Also, less energy is lost to these directional mechanisms.

Roll control (where required) can be achieved in the nozzle by using "jet vanes." The jet vanes can be put in either the initial propellant gas flow or in the final exit gases. In both cases, they can be smaller than in traditional nozzles because they are far from the centerline of the rocket motor and in relatively dense gas moving at high speeds. Therefore, they provide unusually large amounts of torque per unit area of vane. When they are in the final exit gases, they can be made using less exotic materials (e.g., steel vs. tungsten) because the flow is much cooler than in conventional rocket nozzles. The aerospike nozzle is more tolerant of flow disruptions because of these vectoring operations than is a conventional nozzle, because of its basic method of operation. This means that energy losses in the nozzle will be less than in a conventional nozzle.

A number of other alternative configurations are possible. For instance, a truncated aerospike can be used. In a truncated aerospike, the spike is shortened, leaving a flat face. The truncated variant will be lighter and shorter. Studies have shown that this configuration in prior aerospike nozzles suffers very minor loses in thrust.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. An aerospike nozzle, comprising:

a nozzle body and a spike, the nozzle body and the spike defining a generally annular gas flow channel therebetween;

the spike comprising an upper, generally conical section having a decreasing diameter in a downstream direction; a middle, generally cylindrical section having a generally constant diameter; and a lower, generally conical section having a decreasing diameter in a downstream direction;

a shroud disposed radially outward of the spike and longitudinally downstream of the nozzle body, the shroud comprising a first generally cylindrical section and, downstream of the first section, a second generally concave section;

a plurality of struts connected between the spike and the shroud;

an ambient air inlet defined between the nozzle body and the shroud;

a mixing and combustion chamber defined between the spike and the first section of the shroud; and an expansion chamber defined between the spike and the second section of the shroud.

2. The aerospike nozzle of claim 1 wherein the first section of the shroud is disposed radially outward from the middle section of the spike.

3. The aerospike nozzle of claim 2 wherein the second section of the shroud is disposed radially outward from the lower section of the spike.

4. The aerospike nozzle of claim 1 wherein each strut is connected at one end to the lower section of the spike and at another end to the second section of the shroud.

5. The aerospike nozzle of claim 1 wherein each strut is connected at one end to the middle section of the spike and at another end to the first section of the shroud.

6. The aerospike nozzle of claim 1 wherein the lower section of the spike defines a generally concave outer surface.

* * * * *